Oct. 2, 1923.  1,469,526
L. E. OSBORNE ET AL
LOCOMOTIVE BOOSTER
Filed Aug. 25, 1922  2 Sheets-Sheet 2
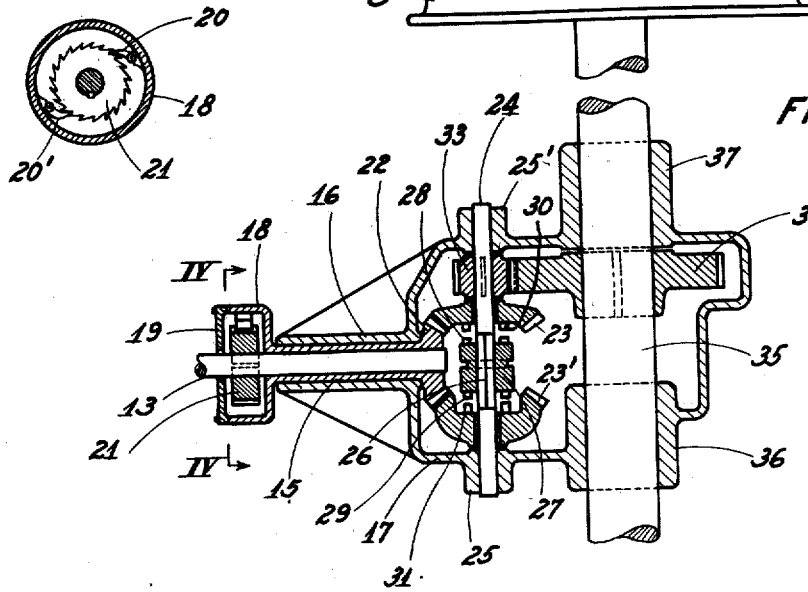
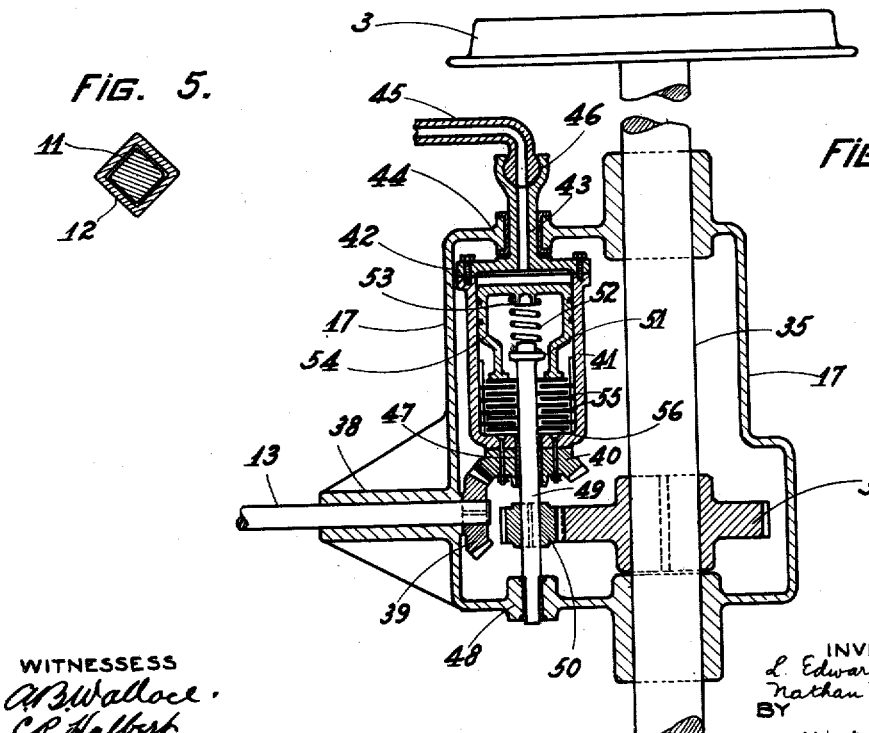
WITNESSES
A. B. Wallace.
C. R. Halbert.
INVENTORS
L. Edward Osborne
Nathan M. Lower
BY
Winter & Brown
ATTORNEYS Patented Oct. 2, 1923.

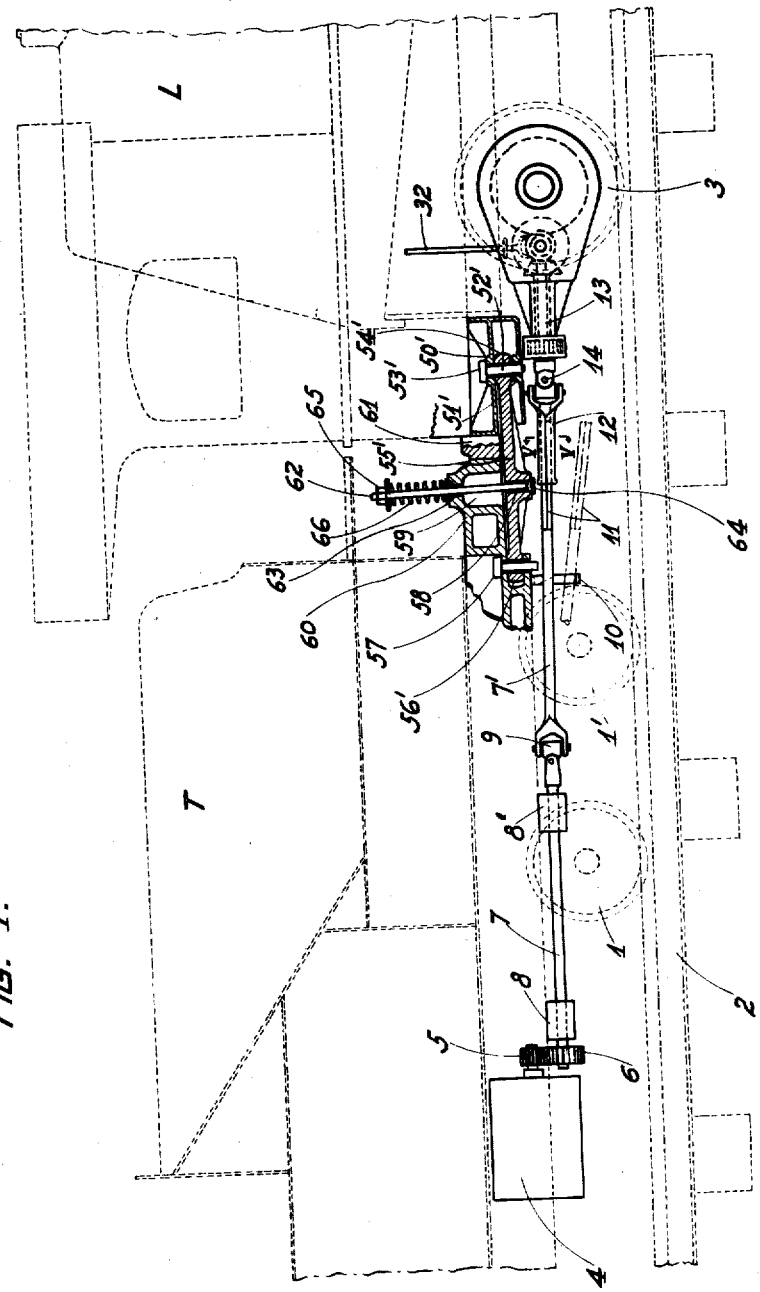

1,469,526

UNITED STATES PATENT OFFICE.

LONNIE EDWARD OSBORNE AND NATHAN M. LOWER, OF BELLEVUE, PENNSYLVANIA.

LOCOMOTIVE BOOSTER.

Application filed August 25, 1922. Serial No. 584,380.

*To all whom it may concern:*

Be it known that we, LONNIE EDWARD OSBORNE and NATHAN M. LOWER, citizens of the United States, and residents of Bellevue, in the county of Allegheny and State of Pennsylvania, have invented a new and useful Improvement in Locomotive Boosters, of which the following is a specification.

This invention relates to what are known in the art as locomotive boosters; that is to say, apparatus for giving supplementary driving traction to railway locomotives.

Where railway locomotives are used to pull very heavy loads, there is difficulty in starting the movement of the train due to the fact that when sufficient power is applied to the driving wheels to move the load, the friction between the driving wheels and the tracks is not sufficient to prevent the spinning thereof. In other words, the driving wheels do not have sufficient traction to immediately pick up and move the load, even though the engine may itself have power enough for that purpose. It has long been proposed to give additional traction to the locomotive, for use during starting, by driving the wheels of the engine tender, which ordinarily merely run idle. For this purpose supplementary motors or engines have ordinarily been mounted upon the tender, and connected in some suitable manner to the axles of the tender wheels, so that the engineer could drive the latter to secure an additional amount of traction. After the train has been started, this supplementary driving mechanism is disconnected so that the tender wheels thereafter run idle during travel of the train. This supplementary driving mechanism is sometimes employed on very severe grades, and elsewhere in case the traction of the regular driving wheels is insufficient, or where additional power is required.

Behind the driving wheels of locomotives there is ordinarily positioned a pair of idle wheels, known as a trailer. These wheels support the rear end of the locomotive, and carry a very large proportion of the weight thereof, in some cases as much as 25% of the entire weight of the locomotive resting on the trailer. In fact, in ordinary locomotive construction so much of the weight is thrown upon the trailer that the breaking of rails is frequently ascribed to this excess weight on these wheels.

Because these trailer wheels carry such a heavy weight, they have a pronounced frictional engagement with the rails, and consequently the driving of the trailer wheels is a very desirable method of boosting during the starting of the locomotive. But it has heretofore been considered impracticable to drive these trailer wheels, because the supplementary engine or motor necessary for such purpose possesses considerable weight, as much as 5,000 lbs. or more, and this excess weight would normally be positioned on the locomotive, and approximately over the trailer axle. The result would be the adding of weight to the locomotive at a point where there is already too much weight, and in the case of heavy locomotives, increase the danger of breaking rails because of the heavy load carried by the trailer.

On the other hand, the tender, while heavy, at no point throws an overload upon the track, and it can be readily used for carrying an additional or booster motor. So far as we know, however, such supplementary motors mounted on the tender have always been used for driving the wheels of the tender instead of the trailer.

We propose to mount a driving motor of any suitable type upon the tender, and to connect it through suitable shafting and universal joints, comprising a slip-joint connection to permit coupling and uncoupling of the tender and locomotive, and thereby drive the trailer wheels of the locomotive without adding any substantial amount of weight to the locomotive. By this arrangement we are able to carry the additional weight where it does the least harm to the track, and at the same time to apply the power to the wheels of the otherwise idle trailer which, because of the great weight carried thereon furnishes the maximum of traction as a booster.

An additional advantage of this arrangement lies in the fact that the supplementary motor and the gearing thereof can be positioned under the tender, where there is normally very little apparatus requiring inspection or repair, whereas if the supplementary motor were positioned under the locomotive, and near the axle of the trailer, which would normally be considered logical, the motor would necessarily be at that part of the locomotive which is most crowded with piping, connecting bars, and various mechanical parts requiring attention and space.

The many advantages of the arrangement which we propose will be readily apparent to those familiar with locomotive engineering.

The object of the invention is to provide means for driving the trailer wheels of a locomotive, and to position the same as to throw the weight of the driving apparatus on the locomotive tender, instead of upon the locomotive.

It is also an object of the invention to mount the booster motor and the gearing used directly in connection therewith, and to removably connect the same with the trailer wheels of the locomotive in a manner which will readily permit relative movements between the several parts normally occurring during movement of the train without interfering with the effective driving action of the motor to the trailer wheels. It is still a further object of the invention to so construct the operative connections for transmitting power from the booster motor to the trailer wheels and to mount the several parts comprising the same upon the locomotive and tender in a manner which will not interfere with the ordinary coupling and uncoupling thereof, and which will permit the locomotive or tender to be used independently of each other in the ordinary and well known manner.

Another special object of the invention is to provide means for connecting the locomotive and tender which will function to transfer a portion of the weight of the locomotive upon the tender, thereby relieving the supporting rails of the excessive load normally concentrated over the trailer wheels, and to so construct the same so as to be capable of use either in connection or independently of the booster apparatus.

It is also a special object of the invention to provide means for resiliently and flexibly connecting the locomotive and tender so as to permit relatively free movement due to changes in the positions of the parts occurring during the normal operation, and at the same time constantly transfer a portion of the weight of the rear portion of the locomotive upon a fixed part of the tender, preferably upon the buffer block used in connection with the tender.

These and other objects of the invention will more readily appear when taken in connection with the following description and the appended claims.

Referring to the drawings, Fig. 1 is a fragmentary diagrammatic view of a locomotive and tender, a special coupling means being shown in section, and the booster apparatus in side elevation; Fig. 2 a fragmentary horizontal section through a clutch mechanism for operatively engaging and disengaging the booster motor and trailer wheel; Fig. 3 a view similar to Fig. 2 showing a different form of clutch; Fig. 4 a section taken on the line IV—IV of Fig. 2; and Fig. 5 a section taken on the line V—V of Fig. 1.

In the drawings, the locomotive as a whole is indicated by the reference character L, and the tender used in connection therewith by the reference character T. As illustrated, the tender is equipped with the ordinary supporting truck, the wheels of which are shown at 1, 1' cooperating with the rails 2 of the track. The rear portion only of the locomotive has been illustrated, which portion is supported by means of the customary trailer wheels 3, ordinarily running idle and serving merely to carry a portion of the weight of the locomotive, as previously pointed out.

A booster motor 4, which may be any type suitable for the purpose, is conveniently mounted and carried upon the tender, it being equipped with suitable gearing indicated at 5, 6, operatively connecting the motor shaft with a drive shaft 7—7' suitably supported and journalled in bearings 8, 8' upon the tender, the sections 7, 7' of the shaft being connected by means of a universal joint 9. The shaft 7—7' extends between the elements of a yoke 10 depending from the truck frame of the tender and prevents the falling of the section 7' into dangerous proximity of the tracks when the locomotive and tender are uncoupled and disconnected. The extremity of section 7' adjacent the end of the tender projects outwardly therebeyond and is non-circular in cross section, as indicated at 11. The portion 11 of the shaft is adapted to be received by a correspondingly shaped bore in a sleeve 12, forming the final element of a system of gearing connected to the axle of the trailer wheels and carried by the locomotive, the said non-circular section of the shaft and the hollow sleeve 12 cooperating to form a sliding slip-joint transmitting rotary movement of the shaft 7—7' to the trailer wheels, while at the same time permitting the parts to accommodate themselves to various positions incident to the relative movements therebetween during normal operation, and permitting the locomotive and tender to be readily coupled and uncoupled.

The hollow sleeve 12 is connected to the extremity of a shaft 13 by means of the universal joint 14, the shaft 13 being journaled within a sleeve 15, which sleeve is in turn journaled in a bearing 16 extending from a housing 17 carried by the trailer frame. The portion of the sleeve 15 adjacent the rear portion of the locomotive is enlarged to form a housing 18 provided with the closure plate 19. Pivotally attached to the inner surface of the housing 18 are a pair of pawls or dogs 20, 20' which co-act with the notched periphery of a ratchet wheel 21 keyed upon the shaft. The inner extremity of the sleeve 15 is provided with a bevel pinion 22 which constantly meshes with a pair of spaced pinions 23, 23' loosely mounted upon a stub shaft 24 journaled at its extremities in bearings 25, 25', formed at the opposite sides of the housing 17. The intermediate portion of the stub shaft 24 is non-circular in cross section, as indicated at 26, and has mounted thereon for sliding movement a clutch collar 27 equipped at its opposite ends with lugs 28 and 29. The lugs 28 are adapted to cooperate with similar lugs 30 formed on the pinion 23, and the lugs 29 are likewise adapted to cooperate with the lugs 31 formed on the ends of the pinion 23'. In order to shift the clutch collar 27 selectively into operative engagement with either of the pinions 23, 23' a shifting lever 32 is provided, which may be connected through any suitable mechanism (not shown) to a convenient location within the cab of the locomotive.

Keyed at one end of the stub shaft 24 is a pinion 33 which meshes with a gear 34 fixed to the axle 35 to which the trailer wheels 3 are attached, said axle extending through bearing bosses 36 and 37 formed at the sides of the housing 17.

The operation of the device, thus far described, is as follows: The locomotive and tender are coupled together in any desirable manner with the non-circular portion 11 of the shaft section 7' disposed within the bore of the hollow sleeve 12. With the parts thus connected and disposed, whenever it is desirable to boost the driving effect of the locomotive, the clutch collar 27 is moved into engagement with either the pinion 23 or the pinion 23', depending upon the direction in which the traction wheels are to be rotated, and the motor 4 set in operation. Upon actuation of the motor 4 power is transmitted through the drive shaft 7—7', the sliding slip-joint 11—12, and the gearing connecting the shaft 13 with the axle 35, to the trailer wheels 3. Because of the great weight concentrated upon the trailer wheels, the frictional contact between them and the rails 2 is considerable, consequently transmitting the power supplied by the booster motor without danger of spinning these wheels. When it is no longer necessary to boost the traction of the main locomotive, the booster motor 4 is stopped and the clutch collar 27 moved to its neutral position, as illustrated in Fig. 2.

As above explained, the clutch collar 27 is moved either into engagement with the pinion 23 or with the pinion 23', according to whether the traction wheels are to be rotated for causing forward or rearward movement of the locomotive. In order to prevent any possibility of the shaft 13, which normally rotates in but a single direction, being rotated in the opposite direction to that for which the mechanism is designed, the said shaft is connected to the rotating sleeve 15 by means of the ratchet wheel 21 and the dogs 20, 20'. This construction enables power to be transmitted from the shaft 13 to the sleeve 15, but would operatively disconnect the shaft and sleeve upon any retrograde movement of the sleeve, thus positively preventing any danger of rotating the motor 4 backwardly.

Fig. 3 illustrates a modified form of gearing which may be employed for connecting the drive shaft 7—7' with the trailer axle 35. In this form the shaft 13 is directly journaled in a bearing boss 38 formed on the housing 17 and has keyed thereto the pinion 39 which meshes with a pinion 40 bolted to the inner end of a piston cylinder 41. The open end of the cylinder 41 is closed by a cover plate 42 having integrally formed therewith a hollow shaft 43 journaled in a bearing boss 44 on the housing 17. Pressure fluid is fed to the interior of cylinder 41 through a pipe 45 which is connected to the outer end of the shaft 43 by means of a ball and socket joint 46. Suitably journaled in a bearing 47 formed in the bottom of cylinder 41 and pinion 40, and in a bearing boss 48 on the housing 17, is a shaft 49 carrying the pinion 50 which meshes with the gear 34. The inner extremity of the shaft 49 is provided with a collar 51 against which one end of a coil spring 52 seats, the other end of which surrounds a boss 53 upon the interior of a hollow piston 54 slidably mounted within the cylinder 41. Associated with the cylinder 41 are a plurality of annular clutch disks or plates 55 which coact with the disks or plates 56 associated with the shaft 49, the disks 55 and 56 cooperating in a well known manner.

The operation of the form shown in Fig. 3 is obvious from the above description. The shaft 13 is constantly driven through the sliding slip-joint 11—12, and consequently constantly rotates the cylinder 41 and the elements 55 of the clutch connected therewith. Whenever it is desired to transmit power from the booster motor to the trailer wheels, the clutch is actuated by admitting pressure fluid through pipe 45 to move piston 54 against the tension of spring 52 bringing the clutch disks 55, 56, into frictional contact with each other and consequently operatively connecting shafts 13 and 49. Rotation of shaft 49 in turn rotates the trailer axle 35 through the inter-meshing pinion 50 and gear 34. Whenever it is desired to disconnect the driving power from the trailer wheels, it is merely necessary to release the pressure fluid from the cylinder 41, permitting spring 52 to retract piston 54, breaking the frictional engagement between the clutch disks.

The improved means for connecting the locomotive and tender, and at the same time permitting normal relative movement between the parts while transferring a portion of the weight of the locomotive upon the tender will now be described.

The rear portion of the locomotive frame is provided with the apertured bosses 50', 51', which are conveniently spaced apart and arranged in substantially vertical alignment. A coupling pin 52' is adapted to cooperate with the apertures of the bosses, the pin 52' extending completely therethrough, being supported by means of the head 53' which rests upon the upper surface of the boss 50'. The distance between the bosses 50', 51' is substantially the same as the thickness of the terminal boss 54' at one end of a draw bar 55', the boss 54' having an aperture through which the pin 52' also projects when the parts are disposed in operative position, as illustrated in the drawings. The opposite extremity of the draw bar is likewise provided with a boss 56' which corresponds in construction to the boss 54', and which is adapted to be pivotally connected with a suitable portion of the tender frame by means of a coupling pin 57 which passes through suitably formed apertures therein, and is supported in an analogous manner to that of the pin 52'. The draw bar 55' is provided with an apertured boss 58 disposed intermediate its ends, said boss lying directly below an opening 59 formed in the buffer block 60 connected to the tender. The buffer block 60 cooperates with a correspondingly formed buffer block 61 fixed to the locomotive, and functions in a well known manner. A bolt or bar 62 extends through an aperture 63 in the buffer block 60 and through the apertured boss 58, being provided with a head 64 which contacts the lower side of the draw bar, and is equipped with a nut 65 at its upper extremity. A coiled compression spring 66 surrounds the bolt and is disposed between the upper surface of the buffer block 60 and the nut 65, suitable washers being employed at the opposite ends of the spring.

When the parts are disposed in operative position, as illustrated in the drawing, the tension of the spring 66 constantly exerts an upward thrust upon the bolt 62, producing a consequent lifting action upon the draw bar 55' which fulcrums around its pivotal connection afforded by the coupling pin 57. The tendency of the draw bar 55' to rise under the tension of the spring causes an upward thrust at the extremity of the bar attached to the locomotive, thereby carrying and causing a portion of the weight of the locomotive to be transferred, due to its connection with the tender, upon the truck thereof. The transfer of a portion of the weight of the locomotive in the manner explained, reduces that normally concentrated upon the trailer wheels 3, transferring the same upon the supporting wheels 1, 1' of the tender, thus more equally distributing the entire weight over an extended area of the tracks. Due to the particular combination and association of the several parts, a portion of the weight is constantly transferred to the tender, regardless of the vertical movements of the parts, caused by inequalities in the rails or of the road bed and on account of the upward pull exerted by the spring 66, which maintains the parts in such relative positions as to continuously function in the desired manner. The association between the parts also permits relative movements which normally occur during the operation, without interfering with the continual transference of the weight from the rear portion of the locomotive to the tender through the mechanism described.

It is thus seen that the invention provides a means for furnishing additional power for the locomotive at the most desirable point to obtain the necessary increased traction, and at the same time relieves the locomotive of the weight incident to the booster motor and its associated parts, and avoids the disposition of the auxiliary boosting apparatus at a portion of the locomotive which is already overcrowded. It is also seen that the improved means for coupling the locomotive to the tender provides a simple and compact mechanism which will effectively transfer a portion of the weight of the rear portion of the locomotive upon the tender, without interfering with the normal traction necessary to be maintained therebetween.

Although we have illustrated and described the preferred embodiment of the invention as required by the patent statutes, it is obvious that many changes may be made in the details of construction or the arrangement of the parts without departing from the spirit of the invention, and it is therefore not intended to limit the invention beyond that particularly pointed out and defined in the appended claims.

We claim:

1. The combination of a locomotive and trailer with its tender, an auxiliary motor located upon the tender, said motor being flexibly coupled to the trailer whereby to permit relative movement between the tender and locomotive.

2. The combination of a locomotive and trailer with its tender, auxiliary driving means located upon the tender for driving said trailer, and reversing means interposed between the said driving means and trailer, said reversing means being located upon the locomotive.

3. The combination of a locomotive and trailer with its tender, auxiliary trailer driving means mounted upon the tender, and means interposed in the driving connection between the said driving means and trailer whereby to permit the trailer to overrun the auxiliary motor driving the same.

4. The combination of a locomotive and its tender, trailer wheels mounted upon and forming a part of the locomotive, a driving motor mounted upon the tender, and operative connections between said motor and trailer wheels whereby to drive the said wheels while relieving the locomotive of the weight of said motor.

5. The combination of a locomotive and its tender, trailer wheels mounted upon and forming a part of the locomotive, a booster motor mounted upon and supported by the tender, and operative driving connections between the motor and trailer wheels, said driving connections comprising a slip joint portions of which are mounted upon the locomotive and tender respectively, which portions are freely detachable whereby to permit relative movement between the locomotive and tender and to render the tender readily detachable from the locomotive.

6. The combination of a locomotive and its tender, trailer wheels mounted upon and forming a part of the locomotive, a booster motor mounted upon and supported by the tender, a shaft having a non-circular portion journaled on the tender and driven by the motor and terminating adjacent one end of the tender, gearing operatively connected to the trailer wheels terminating in a hollow sleeve adjacent the rear of the locomotive and adapted to receive the non-circular portion of said shaft, the non-circular portion of the shaft and sleeve comprising a sliding slip joint whereby to permit relative movement between the parts and to render the tender readily detachable from the locomotive.

7. The combination of a locomotive and its tender, trailer wheels mounted upon and forming a part of the locomotive, a booster motor mounted upon and supported by the tender, operative connections between the motor and trailer wheels, said connections comprising a shaft driven by the motor, gearing interposed between said shaft and trailer wheels, and a pawl and ratchet connecting the shaft and gearing whereby to drive said gearing upon rotation of said shaft in one direction only and to prevent reverse movement of said gearing being communicated to said shaft.

8. The combination of a locomotive and its tender, trailer wheels mounted upon and forming a part of the locomotive, a booster motor mounted upon and supported by the tender, a driving shaft geared to the motor and projecting at one end of the tender, gearing mounted on the locomotive for operatively connecting the said driving shaft and trailer wheels, and a slip joint operatively connecting the driving shaft and said gearing, and a clutch interposed in said gearing for engaging and disengaging the portion of the slip joint carried by the locomotive with the trailer wheels.

9. The combination of a locomotive and its tender, trailer wheels mounted upon and forming a part of the locomotive, a booster motor mounted upon and carried by the tender, a shaft having a non-circular portion journaled on the tender and driven by the motor and terminating adjacent one end of the tender, gearing operatively connected to the trailer wheels terminating in a hollow sleeve adjacent the rear of the locomotive and adapted to receive the non-circular portion of said shaft, the non-circular portion of the shaft and sleeve cooperating to form a sliding slip joint whereby to permit relative movement between the parts and to render the tender readily detachable from the locomotive, said gearing comprising a shaft coupled to the sleeve and journalled in a second sleeve, a ratchet wheel keyed to the last named shaft, a pawl pivoted to the second named sleeve engaging the said wheel, a pinion fixed to the said second sleeve meshing with a pair of pinions loosely journaled on a stub shaft, said stub shaft being geared to the axle of the trailer wheels, and means for selectively connecting either of said last-named pinions with the said stub shaft.

In testimony whereof, we hereunto sign our names.

L. EDWARD OSBORNE.
NATHAN M. LOWER.

Witness:
EDWIN O. JOHNS.